United States Patent [19]

Bodor et al.

[11] Patent Number: 4,587,131

[45] Date of Patent: May 6, 1986

[54] EDIBLE WATER-IN-OIL EMULSION SPREADS CONTAINING DISCRETE GRANULES OR AGGLOMERATES OF GRANULES OF CRYSTALLINE STARCH

[75] Inventors: Janos Bodor, The Hague; Bertus M. Van Bodegom; Cornelis Poot, both of Vlaardingen, all of Netherlands; Freek Reckweg, Hartley, Great Britain

[73] Assignee: Lever Brothers Company, New York, N.Y.

[21] Appl. No.: 677,004

[22] Filed: Nov. 30, 1984

[30] Foreign Application Priority Data

Dec. 1, 1983 [NL] Netherlands ............... 8304132

[51] Int. Cl.$^4$ ............................................. A23D 3/00
[52] U.S. Cl. ............................................. 426/603; 426/661
[58] Field of Search ............... 426/602, 603, 604, 605, 426/613, 578, 661

[56] References Cited

U.S. PATENT DOCUMENTS 2,220,976  11/1940  Schou ................................. 426/602
2,903,364   9/1959  Wode et al. .
3,093,486   6/1963  Krett et al. .

FOREIGN PATENT DOCUMENTS 800937  6/1973  Belgium .
1074176  3/1980  Canada ................................. 426/603
  11891  6/1980  European Pat. Off. .
1023781  3/1953  France .
1313616 11/1962  France .
0071446  5/1980  Japan ................................... 426/603
 262880  5/1964  Netherlands .
8304133  5/1964  Netherlands .
2057848  4/1981  United Kingdom .

OTHER PUBLICATIONS

Uzzan et al., "Additifs Nouveau en Marginerie: Evolution en Fonction de la Legislation Presente et a Venir", Revue Francaise des Corps Gras 19, Sep. 1972, 513–521.

Primary Examiner—Robert Yoncoskie
Attorney, Agent, or Firm—James J. Farrell; Lynne Darcy

[57] ABSTRACT

Edible water-in-oil emulsion spreads with good organoleptic properties, particularly with regard to release of salt, are produced by incorporating in the emulsion at least 1 wt. % of native starch granules or agglomerates of native starch granules in the crystalline state, 80–100% of said granules having a diameter of less than 25 microns.

9 Claims, No Drawings

EDIBLE WATER-IN-OIL EMULSION SPREADS CONTAINING DISCRETE GRANULES OR AGGLOMERATES OF GRANULES OF CRYSTALLINE STARCH

The present invention relates to edible water-in-oil emulsion spreads of the margarine-type and of the reduced fat spread-type containing discrete granules or agglomerates of crystalline, native starch granules.

The present invention particularly relates to improving the release of flavour ingredients such as salt on consumption of w/o emulsion spreads which do not readily invert to o/w emulsions and do not easily break in the mouth.

Examples of such spreads are margarines sold in tropical areas. Because of the high storage temperatures which tropical margarines have to survive, such products have to be produced from fat blends with relatively high levels of fat solids at mouth temperature. A high level of fat crystals results in poor oral melting properties and particularly in a poor release of flavour ingredients such as salt or sugars. Consequently such flavours are badly perceived, even when they are used in high concentrations in the spread.

It is an object of the present invention to improve the organoleptic properties of such spreads, without impairing their microbiologic stability on storage, by incorporating therein an appropriate amount of crystalline, native starch.

It is known to use starch at very low levels (about 2 parts of starch per 1000 parts of product) in margarines as an indicator in order to detect the addition of margarine to dairy butter. The starch may consist of rice-, potato- or maize starch (see Rev. Française des Corps Gras 19, 1972 (8/9), additifs nouveaux en margarinerie, A. Uzzan et M. T. Juillet, pp. 515–519). Such low levels of starch are totally unsuitable for the purpose of the present invention.

It is also known to use starch for increasing the viscosity of the aqueous phase of emulsions in order to stabilize them by preventing exudation of water. In such case, the starch is largely dissolved in the aqueous phase. Such starches may consist of pre-gelatinized starches, enzyme-treated starches, starches decomposed by acids and the like. Also such starches are not suitable for the purpose of the invention.

Applicants have found that w/o emulsion spreads containing an appropriate amount of specific starches as herein after defined display improved, organoleptic properties with regard to release of flavours when compared with spreads which do not contain such specific starches or which contain too low a level of such specific starches.

The edible w/o emulsion spreads according to the invention comprise a continuous fat phase constituting 20–90 wt. % and the dispersed aqueous phase constituting 10–80 wt. % of the total emulsion, said dispersed aqueous phase containing 1–25 wt. %, based on the total emulsion, of discrete granules or agglomerates of native, crystalline starch granules, 80–100% of which having a diameter of less than 25 microns.

The discrete granules or the granules constituting the agglomerates have a diameter or largest dimension of less than 25 microns. Granules or agglomerates of granules that can be used according to the invention are those which are capable of rendering the dispersed aqueous phase of the emulsion coarser without causing sandiness or mealiness.

By crystalline starch is meant starch that displays birefringence under the microscope using polarized light.

In the preferred starch preferably 80–100% of the granules have a diameter between 4 and 15 microns. Suitable kinds of starch, therefore, are preferably selected from the group consisting of rice starch, millet starch, buckwheat starch, oat starch and yam, which can be bought at a reasonable price in large quantities.

These selected starches are incorporated in the emulsion in an amount varying from 1–25 wt. %, based on the total emulsion.

The amount of starch to be used depends on the type of spread aimed at.

For water-in-oil emulsion spreads of the margarine-type, wherein the fat phase constitutes 80–90 wt. % of the total emulsion, the level of starch will vary from 1–5 wt. %, the remainder of the dispersed phase consisting of dispersed drops of aqueous phase.

For water-in-oil emulsion spreads of the reduced fat-type, wherein the fat phase may constitute 20–70 wt. % of the total emulsion, the level of starch will vary from 3–25 wt. %, the remainder of the dispersed phase consisting of dispersed drops of aqueous phase.

The dispersed drops of aqueous phase generally have a diameter ranging from 1–10 microns, although small channels of coalesced aqueous phase may exist along with the finely dispersed aqueous phase.

The aqueous phase of the emulsion, in addition to water, may contain proteins such as milk proteins, salts such as sodium chloride, emulsifiers such as lecithin or monoglycerides, colouring materials, e.g. beta-carotene, thickening agents such as gelatin, preservatives such as sorbic acid etc., which are common ingredients for such emulsions.

The fat components of the fat blend may consist of vegetable or animal fats which may be hydrogenated, interesterified or fractionated. Suitable animal fats may consist of butterfat, tallow or hydrogenated fish oil. Suitable vegetable fats may consist of palm oil, lauric fats such as coconut fat, palmkernel fat or babassu fat; further soybean oil, sunflower oil, rapeseed oil, cottonseed oil, maize oil and the like.

The fat phase of the w/o emulsion spread may consist of any plastic fat blend suitable for producing margarines and reduced fat spreads. Such spreads, which are usually kept in a refrigerator, generally have a plastic consistency within the temperature range of 5°–25° C. At room temperature (about 20° C.) such fat blends have at least 8% crystallized fat. The fat solids profile of such fat blends is preferably such that less than about 3% crystallized fat is present at mouth temperature. Fat blends used e.g. for producing margarines for tropical areas will generally have relatively high levels of crystallized fat at ambient temperature. The fat solids profile of such fat blends will be as follows:

$N_{10°C.} = 15$–$85$; $N_{20°C.} = 10$–$50$; $N_{30°C.} = 5$–$18$; $N_{40°C.} = 0.1$–$8$; $N_{45°C.} = 0$–$3$.

(determined by NMR-analysis according to J. Am. Oil Chemists' Society, Vol. 51 (1974), p. 316.

The granules or agglomerates of starch granules, preferably of the kinds specified above, may be incorporated in the aqueous phase, in the fatty phase, or in the total emulsion. Preferably, in order to avoid agglomeration, the granules are added to the fatty phase and they are dispersed by vigorous stirring, whereafter the fatty phase is emulsified with the aqueous phase and the emulsion thus obtained is subjected to a texturization treatment involving cooling and working to obtain a w/o emulsion spread. During pre-mixing/processing the aqueous phase migrates to the starch granules. During the preparation of the spread, care should be taken that the starch is not heated in the presence of water at temperatures whereby—owing to gelatinization —the aqueous phase may become too viscous. In general a temperature of 50° C. or higher should be avoided. Therefore, if necessary, the aqueous phase is pasteurized before adding the starch.

The mechanism to which the improved taste impression of flavouring agents, such as sugar, salt, aromas, is to be ascribed, is not completely clear. The effect is probably due to the coarser distribution of the droplets of the aqueous phase. It is probable that aggregates of starch granules are strong enough in the "state of rest" to retain the aqueous phase, but that, at the temperature and shear forces prevailing in the mouth and in the presence of saliva, they disintegrate and release the flavouring agents.

The new spreads and their preparation will be illustrated in the following Examples.

EXAMPLE I

A margarine was prepared, starting from a fatty phase of the following composition:
77.50% of a fat consisting of
  40% fish oil, hydrogenated to a melting point of 30° C.;
  33% unhydrogenated soybean oil;
  27% soybean oil, hydrogenated to a melting point of 30° C.;
0.3 % monoglyceride emulsifier;
0.2 % colorant;
2.5 % non-gelatinized, native rice starch (*Oryza sativa L.*) in the crystalline state, showing birefringence. The observed maximum diameter (d max) of the starch granules was 10 microns (about 95% of the granules had a diameter smaller than 10 microns).

The fatty phase displayed the following solid fat profile:

$N_{10°C.}=42$; $N_{20°C.}=24$; $N_{30°C.}=7.5$; $N_{35°C.}=1.5$.

A pre-emulsion was prepared, starting from the above-specified fatty phase and an aqueous phase of the following composition:
0.60% skim milk powder;
0.10% K-sorbate;
2.00% NaCl;
16.56% water.

The pre-emulsion was subjected to a texturizing treatment in a Votator ® apparatus. After the pre-mixing and texturizing treatments, the starch ended up in the aqueous, dispersed phase. The margarine obtained and a margarine of the same composition but without rice used for comparison were examined by a panel with respect to release of salt. The margarine according to the invention was found to be superior to the margarine used as a reference.

EXAMPLE II

Example I was repeated, except that 5 wt. % of native, non-gelatinized, crystalline rice starch (d max.=10 microns) and 75% of fat were used. The results were even slightly better than those obtained in Example I.

EXAMPLE III

Example I was repeated, except that a fat of the following composition was used:
80% palm oil, 10% palm oil hydrogenated to a melting point of 47° C., and 10% palmkernel oil.
The solid fat profile of the fat was as follows:

$N_{10°C.}=53$; $N_{20°C.}=26.2$; $N_{30°C.}=10.2$; $N_{35°C.}=6.0$.

The results of the salt release test corresponded with those obtained in Example I.

EXAMPLES IV, V, VI

The procedures of Examples I, II, III were repeated, except that native, crystalline oat starch (*Avena Sativa L.*) was used, which granules had an observed maximum diameter of 20 microns (about 95% of the granules had a diameter of less than 20 microns).

The salt release tests, using a margarine without salt as a reference, showed a clear preference, expressed by the taste panel, for the margarines produced according to the invention.

EXAMPLES VII, VIII, IX

The procedures of Examples I, II and III were repeated, except that native, crystalline, millet starch (*Panicum miliaceum L.*) was used, which granules had an observed maximum diameter of 14 microns (about 95% of the granules had a diameter of less than 14 microns).

The salt release tests, using a margarine without salt as a reference, showed a clear preference, expressed by the taste panel, for the margarines produced according to the invention.

EXAMPLES X, XI, XII

The procedures of Examples I, II and III were repeated, except that native, crystalline buckwheat starch (Fagopyrum sagittatum) was used, which granules had an observed maximum diameter of 20 microns (about 95% of the granules had a diameter of less than 20 microns).

The salt release tests, using a margarine without salt as a reference, showed a clear preference, expressed by the taste panel, for the margarines produced according to the invention.

EXAMPLE XIII

Following the general procedure of Example 1, a sweet w/o emulsion spread of the following composition was produced:
  60% fat;
  0.2% monoglyceride (Dimodan $P^R$);
  0.2% lecithin;
  18% sugar;
  10% crystalline rice starch (d max.=10 microns);
  11.5% water;
  0.1% K-sorbate;
  0.1% citric acid.
The fat consisted of a mixture of:
  30% palm oil hydrogenated to a melting point of 43° C.;
  20% rapeseed oil hydrogenated to a melting point of 28° C. and
  50% soybean oil The fat solids profile was:

$N_{10°C.}=36; N_{20°C.}=15; N_{30°C.}=5.5; N_{35°C.}=3.0.$

A reference spread was produced from the same composition, except that the starch was replaced by the same amount of water.

A panel of experts tested the taste of both spreads. The panel expressed a clear preference for the spread containing starch, which was found to be sweeter than the reference spread.

The microbiological stability of all the spreads of Examples I-XIII was investigated after a period of storage of 6 weeks at 20° C. None of the products displayed signs of spoilage.

COMPARATIVE EXAMPLE

A margarine was produced according to the general procedure of Example I, except that 2.5% rice starch was replaced by 2.5% potato starch (more than 50% of the starch granules had a diameter greater than 25 microns). This margarine was subjected to a panel of experts who unanimously rejected the product because of its mealiness.

We claim:

1. Edible water-in-oil emulsion spreads comprising a continuous fat phase of 20-90 wt. % and a dispersed aqueous phase of 10-80 wt. % of the total emulsion, said dispersed aqueous phase containing 1-25 wt. %, based on the total emulsion, of discrete granules or agglomerates of native, crystalline starch granules, 80-100% of which having a diameter of less than 25 microns.

2. Spread according to claim 1, wherein 90-100% of the starch granules have a diameter of less than 25 microns.

3. Spread according to claim 1, wherein 50-100% of the starch granules have a diameter ranging from 4-15 microns.

4. Spread according to claim 1, wherein the starch is selected from the group consisting of rice starch, millet starch, oat starch, buckwheat starch and yam.

5. A water-in-oil emulsion of the reduced fat spread-type according to claim 1 wherein the fat phase constitutes 20-70 wt. %, the starch 3-25 wt. % of the total composition, the remainder consisting of dispersed drops of aqueous phase.

6. A water-in-oil emulsion spread acoording to claim 1 or 5, wherein the free aqueous phase is predominantly present as dispersed drops having a diameter ranging from 1-10 microns.

7. A water-in-oil emulsion spread according to claim 1, wherein the fatty phase consists of a fat which has a plastic consistency within the temperature range of 5°-25° C.

8. A water-in-oil emulsion spread according to claim 1, wherein the fatty phase consists of a fat blend having the following fat solids profile, determined by nuclear magnetic resonance, of:

$N_{10°C.}=15-85; N_{20°C.}=10-50; N_{30°C.}=5-18; N_{40°C.}=0.1-8; N_{45°C.}=0-3.$

9. A water-in-oil emulsion of the margarine-type, comprising 80-90 wt. % of a fat phase and 1-5wt. % of a starch, wherein said starch constitutes discrete granules or agglomerates of native crystalline starch, 80-100% of which have a diameter of less than 25 microns, the remainder of the emulsion comprising dispersed drops of aqueous phase.

* * * * *